July 5, 1949.　　　　M. N. YARDENY　　　　2,475,270
MULTISPEED CONTROL APPARATUS
Filed Dec. 4, 1943　　　　　　　　　　5 Sheets-Sheet 1
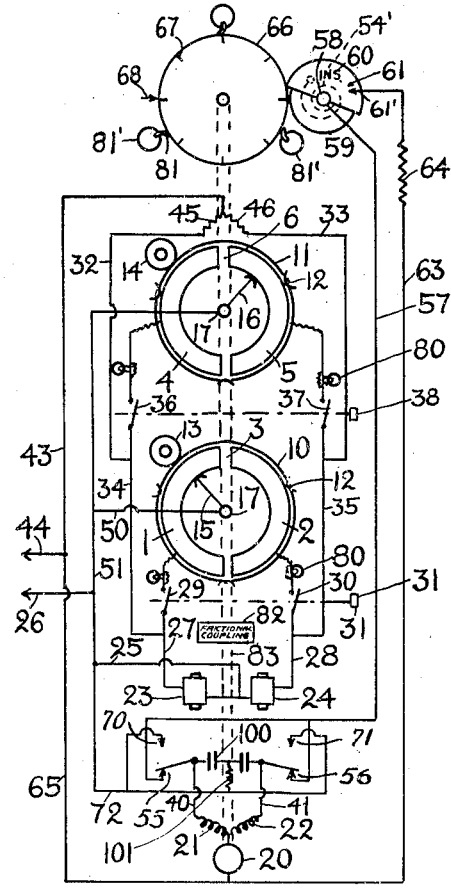
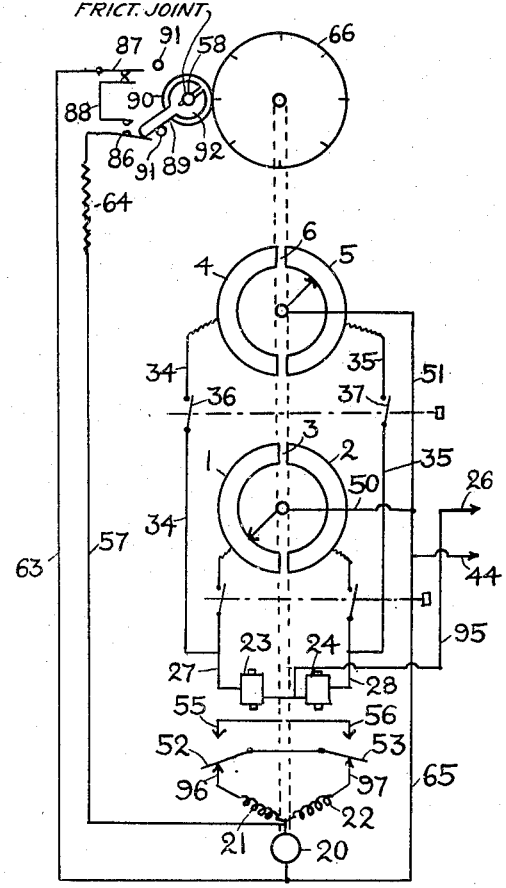
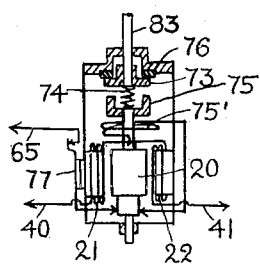
MICHEL N. YARDENY
INVENTOR
BY
John P. Nikonow
ATTORNEY

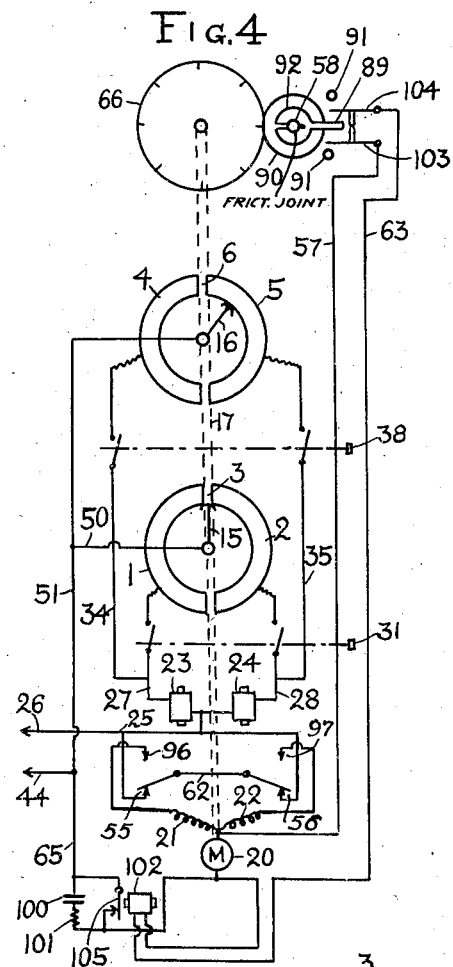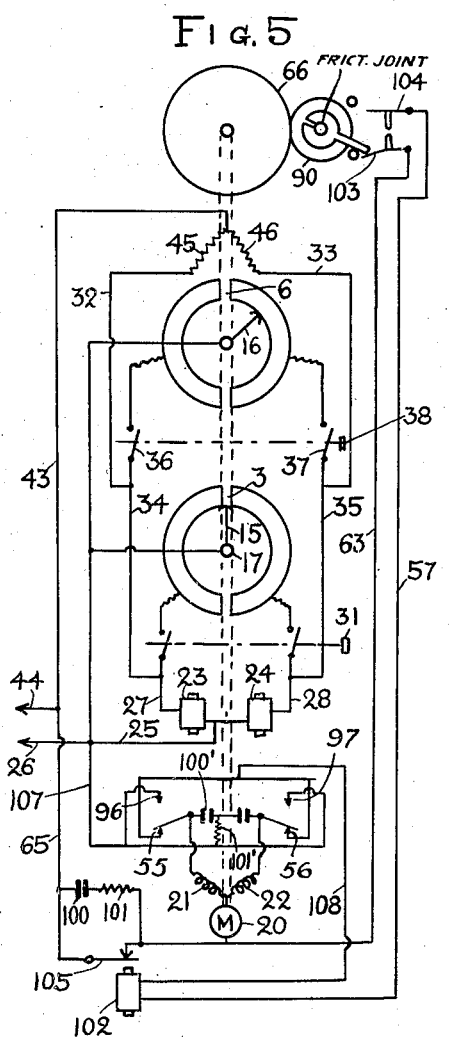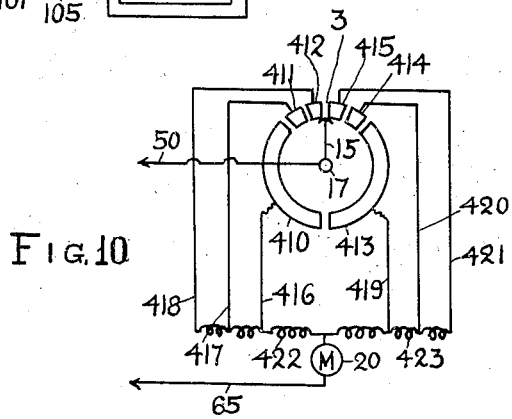

July 5, 1949.                     M. N. YARDENY                     2,475,270
                              MULTISPEED CONTROL APPARATUS
Filed Dec. 4, 1943                                               5 Sheets-Sheet 3

MICHEL N. YARDENY
INVENTOR

BY John P. Nilonow
ATTORNEY

July 5, 1949.    M. N. YARDENY    2,475,270
MULTISPEED CONTROL APPARATUS
Filed Dec. 4, 1943    5 Sheets-Sheet 4
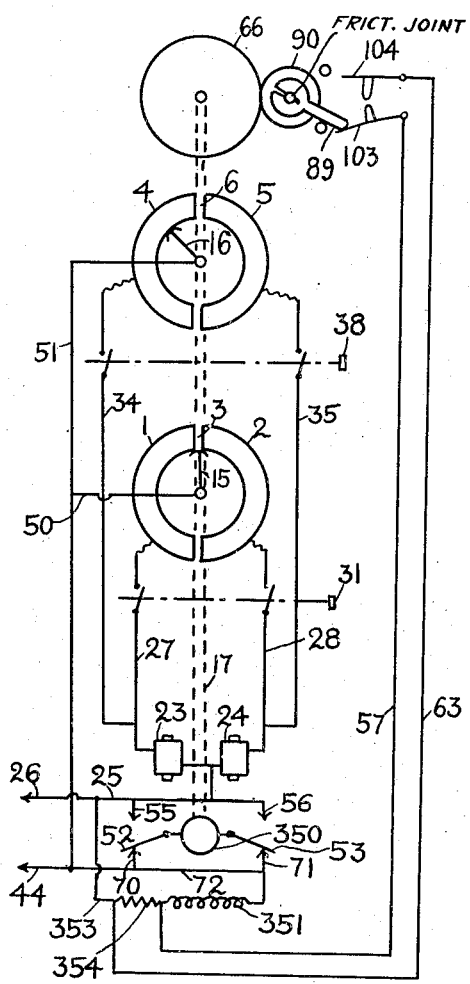
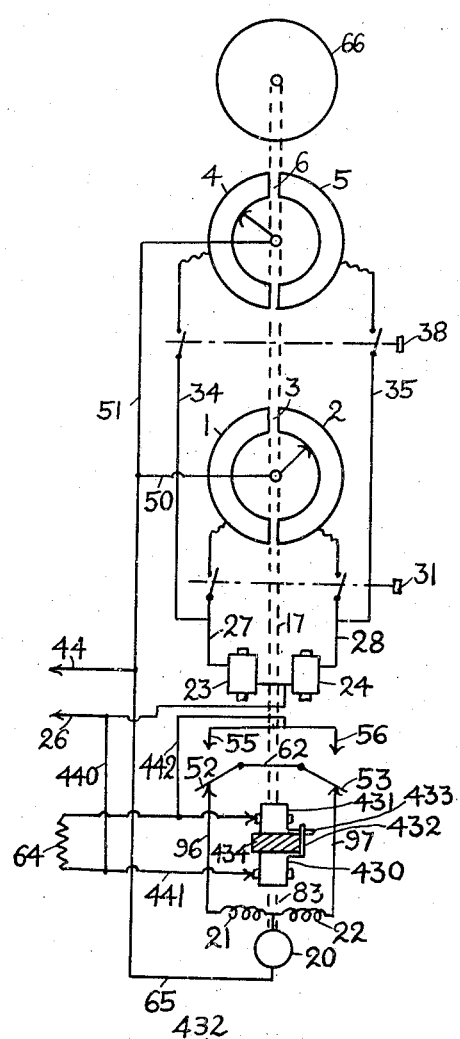
MICHEL N. YARDENY
INVENTOR
BY John P. Nixonow
ATTORNEY

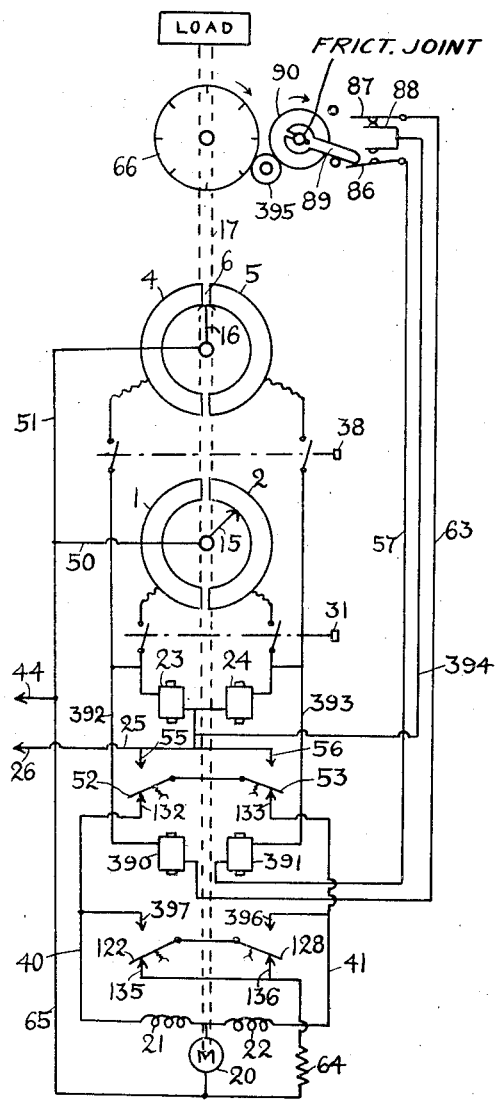
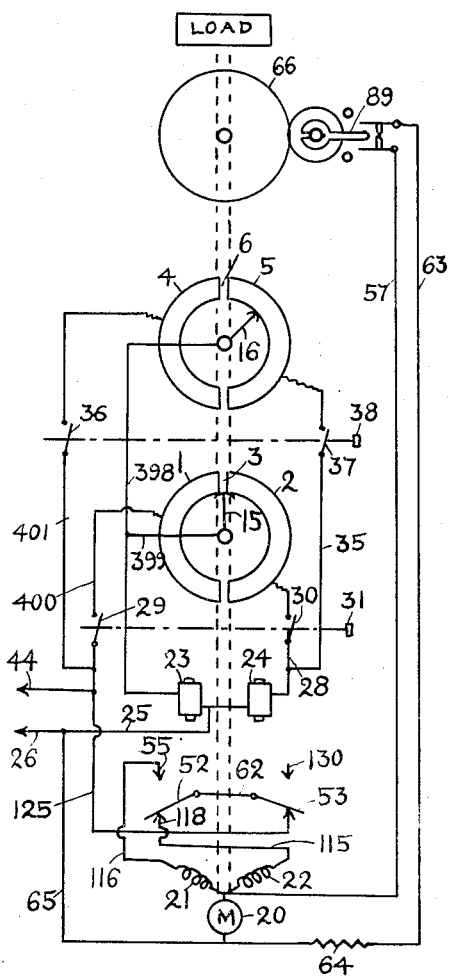
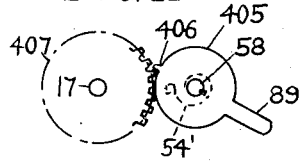

Patented July 5, 1949

2,475,270

UNITED STATES PATENT OFFICE 2,475,270

MULTISPEED CONTROL APPARATUS

Michel N. Yardeny, New York, N. Y.

Application December 4, 1943, Serial No. 512,857

9 Claims. (Cl. 318—33)

My invention relates to multiple speed control apparatus and has particular reference to apparatus and systems in which several selectors or control units are connected together for placing an object or a load into one of several predetermined positions.

My invention has for its object to provide a control system in which each individual selector or control unit has a stopping point for placing a controlled object in a selected predetermined position by driving means, preferably reversible driving means, such as a reversible electric motor, means being provided to reverse rotation of the motor when the control elements of the selectors or control units pass the stopping position. Under such conditions, however, the motor usually has a tendency to swing back and forth from the neutral or stopping position and means must be provided to suppress such oscillations or hunting of the motor. In my copending patent application Serial No. 357,660, filed September 20, 1940, now U. S. Patent 2,342,717, I disclosed means to suppress such hunting, comprising a frictional yieldable coupling or couplings included in the motor drive, and/or means for yieldably retaining the control elements when they occupy the stopping position. Inertia of the motor is then absorbed by the frictional coupling while the control elements still remain in the stopping position. Under certain conditions, however, it is desirable to provide additional means to stop oscillations.

An object of my invention is materially to reduce the speed of the driving means such as a motor at the moment of reversal of its movement, particularly of the rotation of the motor at the stopping point, thereby correspondingly reducing inertia of the motor when the latter passes over the stopping point. There are several practical methods of slowing down the motor or other driving means during a relatively short interval of time immediately after reversal of its rotation or, under certain conditions, when the control elements approach the stopping point.

One such arrangement involves the use of a switch operated by the motor drive and which remains open when the motor rotates in one or the other direction, but is closed for a short time while the motor is being reversed. Such a switch can be utilized for including resistance (or generally, impedance) into the motor circuit for slowing the motor down, for changing motor field connections (as by suitable relays) so as to obtain a materially stronger field during the reversal, etc.

Another means for obtaining the same results consists in the provision of special relatively small segments on the control elements at the stopping points, the segments controlling special relays for changing the connections of the motor windings for reducing its speed. The motor then slows down on reversal of its rotation and/or immediately before such reversal takes place.

Stopping of the control elements at the selected stopping points is made more positive by providing the motor of the drive with an automatic magnetic clutch whereby the motor armature is automatically disconnected from the drive when the control elements reach the stopping position and when the drive is stopped by automatic braking.

My invention is more fully explained in the accompanying specification and drawings in which—

Fig. 1 is a diagrammatic view of my system in which an automatic switch connects the field windings of a reversible motor during reversal of its rotation in such a way that they assist each other for producing an increased magnetic field thereby retarding the motor rotation:

Fig. 2 is a similar view of a modified system in which the automatic switch connects a resistor in parallel with the armature, thereby increasing current through the field winding;

Fig. 3 is a diagrammatic view of an automatic clutch mechanism for the motor.

Fig. 4 is a diagrammatic view of a system in which a vibrating interrupter is included in the motor circuit by the automatic switch, in parallel with the armature;

Fig. 5 is a similar view of a system in which the vibrating interrupter is placed in series with the armature;

Fig. 8 is a similar view of a system in which a shunt wound motor is employed, the automatic switch changing the field connections, the motor being stopped by dynamic braking;

Fig. 9 is a similar view of a system in which a series wound motor is employed and modified reversing switches;

Fig. 10 is a similar view of a system with several gaps between the conducting members;

Fig. 11 is a detail view of a modified rotary switch;

Fig. 12 is a diagrammatic view of a system in which relays are employed in connection with the rotary switch;

Fig. 13 is a similar view of a system in which a resistor is connected by the rotary switch;

Fig. 14 is a detailed view of the arrangement of a gap between two conducting members.

Figure 6:
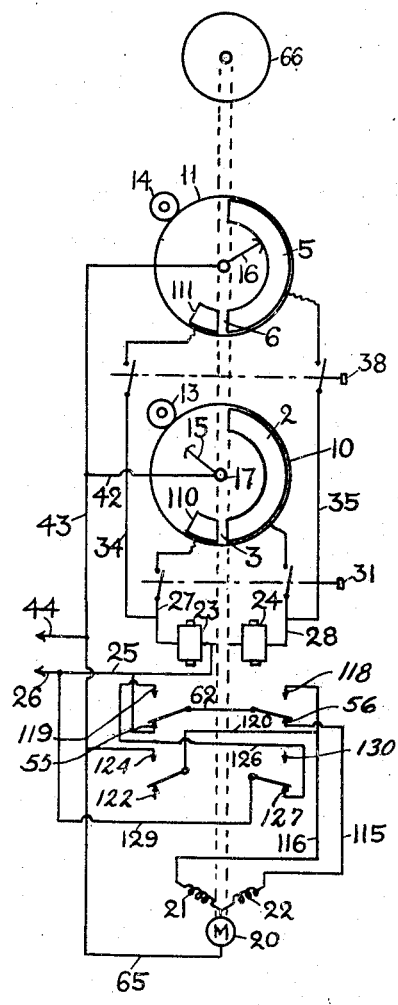
Fig. 6 is a similar view of a system in which the motor winding connections are changed by a special contact segment on the selector.

My control system as shown in Fig. 1 consists of a plurality of control elements, each element in this particular example comprising conducting members or segments 1, 2, separated by a gap 3 and conducting members or segments 4, 5, separated by gap 6. The segments are insulated from each other by any suitable means, preferably by mounting on insulation discs 10, 11, supported in guiding bearings 12 and whose position can be adjusted by manually operable friction wheels 13, 14. Only two pairs of conducting segments are shown in this example but it is understood that there may be as many such pairs as it is desired to have predetermined positions for the load or controlled member.

Each control element further comprises a contact arm 15 and 16, respectively, slidably engaging the segments and rigidly mounted on a common shaft 17 connected directly or by a suitable transmission (not shown) with the driving means, for example, an electric motor 20. When one of these contact arms 15, 16 reaches a gap 3, 6, it connects the segments for example by bridging the gap. The motor may be of any suitable type, for direct or alternating current; a series wound motor is shown by way of example, with two reversing windings 21, 22. The motor is controlled by the control elements through two relays 23, 24 connected by a common lead 25 to a terminal 26 of a source of current, and by leads 27, 28 to the segments 1, 2 through switches 29, 30 which can be manually operated by a handle 31. The relays are also connected to the second set of the segments 4, 5 by leads 34, 35 through switches 36, 37, operated by a handle 38. With this arrangement it is possible to energize selectively any of the control elements or selectors.

To avoid sparking at the gaps, the relays are continuously energized through resistors 45, 46, connected at one side with the second terminal 44 of the source of current by a lead 43, the other ends of the resistors being connected by leads 32, 34, 27 and 33, 35, 28 to the respective relay 23 and 24. The motor is deenergized when both relays are energized. If one of the pairs of segments is energized by operating switch handle 31 or 38 respectively, one of the relays becomes short circuited and inoperative, leaving the other relay operative. Thus if the switches 29, 30 are closed by the handle 31, relay 23 will be short circuited by the contact arm 15, segment 1 and leads 50 and 51.

The relay arms 52, 53 are connected to the ends of the motor windings 21, 22 by leads 40, 41 and are normally held against the contact points 55, 56, but are urged by the relays, when the latter are energized, against contact points 70, 71, connected by a common lead 72 with the terminal 26.

Thus if relay 24 is energized and is operative (not short circuited), the arm 53 engages the point 71. The motor is then energized, being connected to the terminals 44, 26 through a lead 65, winding 22, lead 41, arm 53, point 71 and lead 72. The motor will rotate in such a direction as to move the arm 15 of the energized selector toward the gap 3. The other winding 21 will be energized when the relay 23 is operative, the motor then rotating in the opposite direction. Both relays will be short circuited and deenergized when the gap is bridged by the contact arm 15, disconnecting the motor from the circuit, as previously explained.

To make stopping of the contact arm 15 more positive when the gap is reached, the motor may be provided with an automatic clutch and brake as shown diagrammatically in Fig. 3. A shaft 83 which is an extension of the shaft 17 is connected to the shaft of the armature 20 by a clutch 73, normally held disengaged by a spring 74. The clutch is attracted by a magnet 75 with a coil 75' included in the motor circuit and energized together with the motor. The clutch, when disengaged, is pressed by the spring against a stationary frictional surface 76 in the motor, stopping the shaft 83 and separating the armature from this shaft.

For the rapid operation of the device it is desirable to rotate the contact arms 15, 16 at a relatively high speed toward the gaps, but for the effective stopping at or in the gaps, it is desirable to reduce the speed. Such reduction of speed can be accomplished by connecting the second motor winding in parallel with the first winding when the motor reverses its rotation due to the contact arm 15 overrunning the gap, thereby increasing the strength of the magnetic field. Such an arrangement is shown in Fig. 1. The points 55, 56 are connected by a lead 57 with a shaft 58 of a rotary switch, comprising a metal segment 59, electrically connected with the shaft 58, and an insulation segment 60. A brush 61 engages the segments and is connected by a lead 63 through a resistor 64 with the armature of the motor 20 and with the terminal 44 by the lead 65.

The insulation segment 60 is frictionally engaged by a disc 66 mounted on the shaft 17. Disc 66 is provided with divisions 67 for indicating the position of the shaft 17 in relation to a stationary point 68. The metal segment 59 has a smaller diameter and is not engaged by the disc 66. It follows therefore that the rotary switch remains stationary, in a position as shown in Fig. 1, during a counterclockwise rotation of the main shaft 17. The brush 61 then engages the insulation segment 60 disconnecting the leads 57, 63. As soon as the motor rotation is reversed, however, the insulation segment is engaged by the disc 66 and is rotated until the metal segment 59 reaches the disc 66. During the time of this approximately one-half revolution of the shaft 58, the brush 61 closes the circuit from the points 55, 56, through leads 57, 63 and 65 and resistor 64. As a result, an additional circuit will be closed through the motor, from the energized winding 21, through the winding 22 (in the opposite direction so that now it is in parallel with the winding 21 increasing the magnetic flux), relay arm 53, point 56, leads 57, 63, resistor 64 and lead 65 to the terminal 44. Hence both windings will be energized during the time when the segment 59 passes under the contact brush 61, causing the motor to slow down. Such reduction of the speed of rotation immediately upon reversal of the motor materially helps to suppress further oscillations of the motor.

Signal lamps 80 or similar optical or audible signal devices may be provided in various leads or circuits for indicating the beginning and/or end of each operation.

An additional device for retarding rotation of the shaft 17 may be provided in the form of a mechanical device comprising tongues 81, preferably made of rubber or other suitable flexible frictional material supported on posts 81' and engaging the disc 66. The tongues are so arranged that their friction is negligible during steady rotation of the disc, they being then deflected in direction of rotation, but their frictional resistance greatly increases during reversal of the rotation, when they are forced by the friction to change their positions into the new direction of rotation, finally again assuming the almost frictionless position in direction of the reversed rotation. Usually, however, one only retarding device is used, either mechanical, or electrical.

As an additional means to suppress hunting of the control elements, a sliding frictional coupling 82 may be provided between the main shaft 17 and the extension shaft 83, extending from the motor. The frictional coupling consists of several discs, resiliently compressed together and provided with slots at their peripheries, for fingers 84, 85 extending from the outer discs, mounted on the ends of the respective shafts. The slots are elongated so that a limited amount of slippage is made possible between the discs when rotation of the shafts 17, 83 is reversed.

Sparking at the relay contacts may be suppressed by the use of condensers 100 and a resistor 101, connected in shunt with the relay contacts. Such an arrangement can be used with all other modifications of my system.

A modified system is shown in Fig. 2 in which the strength of the field is increased during reversal of the motor rotation by short circuiting the armature through the resistor 64, thereby increasing the total current and, consequently, the strength of the magnetic field. The armature terminals are connected for this purpose by leads 63, 57, with the rotary switch. The latter in this case comprises two pairs of switch members 86, 87, connected in series by a lead 88. A lug 89 of a collar 92 frictionally mounted on shaft 58 engages and disconnects one or the other of the switch members, when brought to a stop by abutting one of the posts 91, depending on the direction of rotation of the shaft 58, the latter being rotated by the wheel 90, frictionally engaging the disc 66. The collar remains pressed against one of the stops 91 during steady rotation. Both switch members remain closed only during the time when the rotation is reversed and the finger or lug 89 moves from one stop to the other. When both switch members 86, 87 are closed, resistor 64 short circuits the armature of motor 20, through leads 57, 63.

Although this arrangement can be used with any motor in my system and with any arrangement for the motor control, a simplified system is shown in Fig. 2 by way of an example. One or the other of relays 23 or 24 is energized, depending on the position of a selected contact arm on one or the other of the corresponding conducting segments, through leads 51 and 95. The energized relay raises its contact arm 52 or 53 respectively, closing the motor circuit through one or the other of the field windings 21, 22, which are connected with contact points 96, 97, normally engaged by the arms 52, 53. The motor is disconnected from the circuit at contact points 96, 97 and deenergized when both relays are energized by a contact arm reaching a gap and raise contact arms 52 and 53 as shown in Fig. 2.

Another modified system is shown in Fig. 4. In this system a vibrating interrupter is included in the motor circuit for a limited period of time after a reversal of rotation to retard the rotation. The vibrating interrupter comprises a magnet coil 102 included in the lead 63 extending to the rotary switch. The latter is shown in a modified form, having resilient contact arms 103, 104, being resiliently urged toward each other but kept apart by the pressure of the finger 89 during steady rotation of the motor. Lead 57 is connected to one terminal of the armature, lead 63 being connected to the other terminal through the coil 102. The coil when energized vibrates an arm 105 controlling contacts connected in series with the armature and with the terminal 44 of the source of current through a lead 65.

The motor rotates in one or the other direction depending on the direction of current through one or the other of the windings 21 or 22. During reversal of rotation, however, when the contacts 103, 104 are closed, as previously explained for contacts 86, 87, the coil 102 vibrates the arm 105, interrupting and closing the circuit. The vibrations continue more or less rapidly, greatly reducing the speed of the motor and preventing its oscillations or hunting.

A condenser 100 and resistor 101 may be connected across the contacts of the vibrator to suppress the sparking.

Another modification is shown in Fig. 5 in which vibrator 102 is employed in series with the motor, and in addition the motor is retarded by the increase in the strength of its magnetic field. When one of the relays is energized as, for instance, relay 23, by closing one of the switches 31, 38, the arm 52 engages the contact point 96. Current will then flow from the terminal 26 through a lead 107, point 96, arm 52, winding 21, armature of the motor 20, vibrator arm 105, lead 65 and terminal 44. The motor will rotate for bringing the contact arm 15 or 16 toward the gap 3 or 6. The vibrator coil 102 will remain deenergized, the rotary switch being open. As soon as a contact arm reaches a gap, however, and overruns the same by inertia, the other relay 24 will be energized instead of the relay 23. Arm 52 will return to point 55 and arm 53 of relay 24 will engage point 97. Current will then flow from the terminal 26 through the lead 107, point 97, arm 53, winding 22, motor armature 20, arm 105, lead 65, and terminal 44. The rotary switch will be closed by the reversal of rotation for a short period (position of the rotary switch shown in Fig. 4). During this period current will flow from the winding 22 through the winding 21, arm 52, point 55, lead 108, coil 102, leads 57 and 63 through the rotary switch contact points 103, 104, vibrator arm 105, lead 65, and terminal 44. As a result, in addition to winding 22, the second winding 21 will be energized opposite to the normal direction, i. e. for increasing the field, produced by the winding 22 and thereby slowing down the motor. At the same time the coil 102 will vibrate arm 105, breaking and closing the circuit. The vibrator will then continuously vibrate, retarding and weakening the motor to such an extent, that tendency to hunting will be rapidly overcome and the motor will stop. At the end of the reversal period contacts 103, 104 are reopened and disconnect the vibrator. Condensers 100 and resistor 101 may be provided to prevent sparking.

In a system shown in Fig. 6, the motor is reversed at the gap without the use of a rotary switch. Each selector in this case has one complete segment 2 or 5, the other segment 110 or 111 being relatively small, the segments being separated by a gap 3, 6, there being large spaces on the insulation discs 10 and 11 between the other ends of the segments. The small segments are connected by leads 27, 34 to the relay 23, the large segments being connected to the relay 24 by leads 28, 35. The contact arms 15, 16 are connected by leads 42, 51 to the terminal 44, which is also connected to the motor by lead 65.

The motor winding 22 is connected by a lead 115 with the contact point 56, normally engaged by the contact arm 53 of the relay 24. Arm 53 is connected by lead 62 with the contact arm 52 of relay 23 normally engaging the contact point 55. This contact point is connected with the lead 25, extending from the terminal 26. The motor winding 21 is connected by a lead 116 with a contact point 119 which is also connected by a lead 120 with a second arm 121 of the relay 23, normally held against an insulated point 122. The arm 121, when attracted by the relay, engages a contact point 124, connected by a lead 125 with the lead 65. The contact point 119 is connected by a lead 126 with a contact point 127, normally engaged by a second arm 128 of relay 24. Arm 128 is connected by a lead 129 with the terminal 26. Point 130 is an insulated point against which arm 128 is held when relay 24 is energized.

As is shown in the drawing, the motor is energized through the winding 22, lead 115, point 56, arms 52, 53, lead 25 and terminal 26, when the coils of both relays are deenergized as, for instance, when it is desired to bring the contact arm 15 into the gap 3, and the arm is located on the insulated space as shown. The motor will turn rapidly counterclockwise until the arm 15 engages the short segment 110. Assuming switch 31 to be closed, relay 23 will be then energized, attracting both arms 52 and 121. As a result, the motor winding 22 will still be energized, current flowing from the winding 22 through the lead 115, arm 53, lead 62, arm 52, point 119, lead 126, point 127, arm 128, lead 129 and terminal 26. The current will also flow, however, through the winding 21, lead 116, lead 120, arm 121, point 124 and leads 125 and 65 to the terminal 44. The second winding 21 is now connected in shunt with the motor armature and in such a way as to increase the magnetic field, not only by adding the magnetic field of the second winding, but also by increasing the total current through the motor. The motor will rotate more slowly when approaching the gap 3 and will lose its tendency to oscillate.

The motor will be similarly retarded when the gap 3 is approached over segment 2 by the contact arm 15 from the opposite direction, the speed being then reduced after the motor rotation is reversed.

The relay 24 will be energized when the arm 15 engages the segment 2. Both arms 53 and 128 will be attracted, engaging points 118 and 130, the latter being insulated. Current will flow from the terminal 26 through the arms 52, 53, point 118, lead 116, winding 21, motor armature 20, and lead 65 to the terminal 44. The motor circuit is disconnected at point 130 when both relays are energized.

Figure 7:
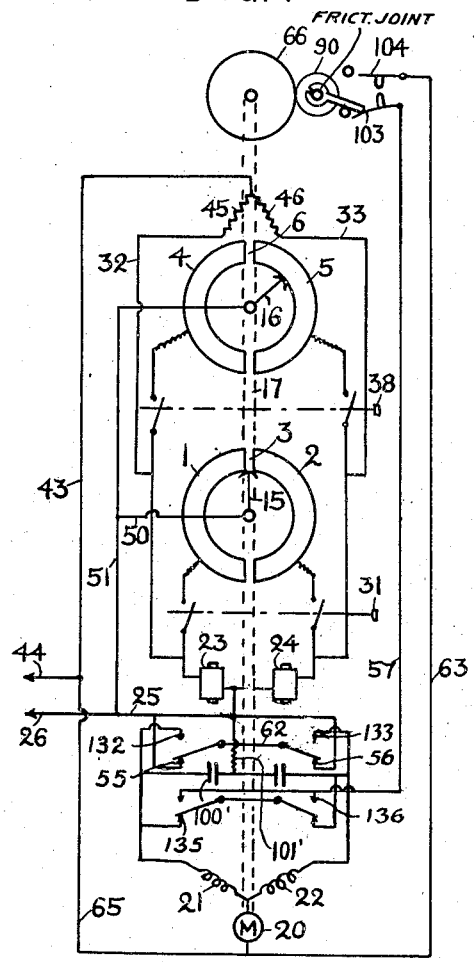
Fig. 7 is a similar view of a system in which one of the field windings is connected in parallel with the armature by the automatic switch.

Another modification is shown in Fig. 7, double throw relays being used for obtaining retarded rotation when the rotary switch is closed during reversal of rotation. It should be noted that it is advisable to use resistors 45, 46 in the relay circuits for suppressing sparking when double throw relays are used, because of the stronger current required for such relays.

The relay arms 52, 53 connect the armature of motor 20 through one or the other of the windings 21, 22, depending on the relay which is energized. The other winding also becomes energized when the rotary switch is closed during reversal of rotation. Thus, if the relay 23 is energized, both its arms 52 and 122 will be attracted and engage contact points 132 and 135. The main current for the motor will flow through point 56, arm 53, lead 62, arm 52, point 132, winding 21, motor 20 and lead 65. The current will also flow through the winding 22 in the reversed direction, strengthening the magnetic field, through the point 133, arm 128, arm 122, point 135, lead 57, switch contacts 103, 104, lead 63 and lead 65 to the terminal 44 while the rotary switch is closed. The motor rotation will be therefore retarded every time, when direction of rotation is reversed.

A system with a shunt wound motor is shown in Fig. 8. The motor armature 350 is connected at the terminals with the contact arms 52, 53 of the relays 23, 24 normally engaging contact points 70, 71 of the relays. If one of the switches 31, 36 is closed and hence one of the relays 23, 24 is energized, one of the arms 52, 53 will engage contact point 55 or 56 thus connecting the armature in one or the other direction. The motor rotation is reversed by reversing current through the armature. The shunt field winding 351 of the motor is always connected to the terminals 26, 44 by leads 72 and 353 through a resistor 354. The latter is short circuited by the contacts 103, 104 of the rotary switch to which it is connected through leads 57, 63 during reversal of the rotation, thereby increasing the strength of the current through the shunt field and slowing down the motor rotation.

It should be noted that the motor armature is short circuited not only when both relays are energized but also when they are both deenergized, stopping the armature rotation by dynamic braking. This system is therefore operative not only when the gap is bridged by the contact arm 15 or 16 but also when the gap is wider than the contact arm and the circuit is completely interrupted at the gap.

In the system shown in Fig. 9 a coupling serving also as a switch is employed between the motor and the drive shafts, the coupling being of such a nature that it allows overrunning of the motor when it reverses its rotation. The coupling is combined with a switch for including a resistor or similar impedance into the circuit when the reversal of rotation takes place, thereby suppressing a tendency of the moving parts to oscillate or hunt.

The coupling and switch consists of two parts, 430 on the motor shaft 83 and 431 on the drive shaft 17. The part 430 is provided with a hook 432, engaging a finger or lug 433 on the part 431. Driving torque is normally transmitted by the hook and finger members, but upon reversal of the motor rotation, the hook makes almost a complete turn before it engages the finger again from the other side. Frictional discs 434 may be provided between the parts 430 and 431 with sufficient frictional torque to return the contact arm into the gap but not sufficient to displace the contact arm from the gap. It is understood, of course, that the gap and the contact member are constructed accordingly as shown, for instance, in Fig. 14. The gap arrangement is described more fully in my copending application Serial No. 357,660 filed September 20, 1940 now U. S. Patent 2,342,717, all the modifications disclosed therein may be preferably used in connection with my new invention. As shown in Fig. 14, the contact members 1 and 2 are provided with raised ends 435, 436 at the gap 3, forming a seat for a contact ball 437 at the end of the contact arm 15.

In the operation of the system according to Fig. 9, motor rotation is reversed after the contact arm overruns the gap by inertia of the motor and other moving parts. The hook 432 then leaves the finger 433 so that no torque is exerted on the drive shaft 17 during reversal of rotation, except a very weak torque which is transmitted through the frictional discs 434 only sufficient to bring the contact arm in the gap.

The main circuit for the motor through leads 440, 441, parts 432, 433, lead 442, energized arm 52 or 53, corresponding winding 21 or 22, armature 20 and lead 65 to the terminal 26, is interrupted at the parts 432, 433 of the switch coupling during the reversal period and resistor 64 is now connected in series with the motor, slowing down the rotation of the motor. The resistor can be, of course, connected in parallel with the armature as, for instance, shown in Fig. 2.

The motor, having largely lost its inertia due to the reduced speed and being deenergized by the contact arm bridging the gap, will come to a stop without dislodging the contact arm from the gap. As an added means to prevent oscillations, the motor may be provided with a clutch and brake as shown in Fig. 3.

Under certain conditions it may be advisable to provide more than two different speeds for the motor. Such a system is shown diagrammatically in Fig. 10. Several segments are provided at each side of the gap 3, such as segments 410, 411, 412 at one side, and segments 413, 414 and 415 at the other side, connected by leads 416, 417, 418 and 419, 420, 421 with corresponding taps of the motor windings 422, 423. The windings may be so arranged as to increase the magnetic flux with the approach of the main gap 3 by the arm 15, or if desired, the flux may be decreased for increasing the motor speed.

A modified rotary switch is shown in Fig. 11, a gear 405 with a single tooth 406 being rigidly mounted on the shaft 58. The gear is engaged by a gear 407 on the shaft 17. The gear 405 is turned through a small angle every time the direction of rotation is reversed. The resiliency of the contact arms 86, 87 urges the gear 405 in mesh with the gear 407.

In the system shown in Fig. 12 additional relays 390, 391 are provided and connected with the relays 23, 24 by leads 392, 393 and with terminal 26 by leads 57, 63, rotary switch contact points 86, 87 connected by lead 88 and leads 394, 25. The relay arms 122, 128 of relays 390, 391 normally engage contact points 135, 136 and have no effect on the motor windings 21 or 22.

The rotary switch is so constructed that the wheel 90 rotates in a direction for disconnecting the relay 390 or 391 on the side of the energized relay 23 or 24. A second or idler pinion 395 may be employed for this purpose if necessary. The other relay 390 or 391 will be deenergized together with the deenergized primary relay 23, 24.

During the reversal of rotation, the secondary relay is energized, attracting the arm 122 or 128 and connecting the second winding and the resistor 64 in shunt with the motor 20, thereby slowing down the rate of rotation.

Thus if the switch 31 is closed, relay 24 will be energized, attracting the arm 53 and energizing winding 21, causing the motor to rotate in a direction for bringing the arm 15 to the gap. Relay 391 will be deenergized since lug 89 interrupts its circuit at contact 86. With the reversal of rotation, however, when the contact arm 15 overruns the gap, the lug or finger 89 will leave the resilient contact 86, thus closing the circuit for the relay 391 as previously described. Arm 128 of relay 391 will be raised and the current will flow through the second winding 22, lead 41, point 396, arms 128 and 122, point 135, resistor 64 and lead 65 to the terminal 44. The winding 22 will be connected in reverse thereby increasing the magnetic flux of the field. Similar circuits are closed through contact points 397 and 135 if relay 23 is energized.

A modified system is shown in Fig. 13 in which the segments 2, 5 are connected to the relay 24 by leads 28 and 35 with switch contacts 30 and 37, while the relay 23 is connected to the arms 15, 16 by leads 398, 399. The segments 1 and 4 are connected by leads 400, 401 with the terminal 44 through switch contacts 29, 36.

If, for example, the switch 38 is closed, the relays will remain inoperative, but current will flow through the motor by the lead 65, winding 22, lead 115, contact point 118, arm 52, lead 62 and arm 53, and lead 125 to the other terminal 44. The motor will rotate the shaft 17 for bringing the arm 16 over segment 5 into the gap 6. When the arm 16 overruns the gap 6 and passes by inertia to the segment 4, relay 23 will be energized, causing the arm 52 to engage the point 55. Furthermore, the rotary switch will close its contacts. Winding 21 will be then energized during the reversal period and hence resistor 64 will be included in shunt with the armature, slowing down its rotation, until the motor is stopped, with the arm 16 bridging the gap. Both relays are now energized so that both arms 52 and 53 will be raised, disconnecting the motor.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A control apparatus comprising a pair of control elements, one element comprising conducting members separated by a gap, the other element comprising a contact member for engaging the conducting members; a reversible motor having reversing windings connected in series with the motor armature; drive means including said motor to effect relative movement between the control elements; means to control rotation of the motor by the control elements by energizing one or the other of the windings by the position of the contact member on one of the conducting members and to stop the motor by the contact member reaching the gap; and means to connect the second winding in series with the first winding so as to increase the magnetic field in response to the contact member occupying a predetermined relative position near the gap.

2. A control apparatus comprising a pair of control elements, one element comprising conducting members separated by a gap, the other element comprising a contact member for engaging the conducting members; a reversible motor having an armature; drive means operated by the motor for effecting relative movement between the control elements; means to control rotation of the motor and direction of its rotation by the position of the contact member on one or the other of the conducting members and to stop the motor by the contact member reaching the gap; an impedance element; circuit means to connect the impedance element in shunt with the said armature for increasing the motor field; and switch means to close the impedance circuit for a limited period of time after reversal of the motor rotation.

3. In a remote control apparatus for placing a load in a selected one of a plurality of predetermined positions, in combination, a pair of relatively movable members, one of the members having electrical conducting elements and neutral points, the other member having a plurality of contact elements engageable with respective ones of the said conducting elements depending upon the desired direction of load movement, drive means including a motor for moving the load, the said pair of members being predeterminedly adjusted to displace the said neutral points and contact elements according to respective ones of the said plurality of predetermined load positions, means under control of the load motor for moving one of the said pair of members in a direction to cause alignment of the said respective ones of the said contact elements and neutral points to stop the motor, the said member overrunning beyond the neutral point into engagement with the other conducting element to cause a reversal of the said motor rotation, electrical means for reducing the speed of the load motor, switch means constructed to assume either one of two limit positions and connected to render the said electrical means inoperative for the purposes aforesaid in either limit position and operative in an intermediate position, and switch control means operatively connected with the load motor and constructed to place the switch means in one limit position when and while the motor is rotating in a direction as determined by the adjustment of the said members, and to move the switch means into the other limit position upon the said reversal of the motor rotation, thereby rendering the electrical means operative for load motor speed reduction during a limited period of time.

4. In control apparatus for placing a load in a desired position, in combination, a pair of relatively movable members, one of the members having electrical conducting elements and a neutral point, the other member having a contact element engageable with one or the other of the said conducting elements depending upon the desired direction of load movement, drive means including a motor for moving the load, an energizing circuit for said motor, one of the said pair of members being pre-set to displace the said neutral point and contact element according to the desired load position, means under control of the load motor for moving the other member to cause alignment of said contact element and neutral point to stop the motor, the said member overrunning beyond the neutral point into engagement with the other conducting element to cause a reversal of motor rotation, contact means in said energizing circuit for periodically interrupting the current to the said load motor, a switch adapted to operate the said contact means, and a rotary member frictionally driven from the load motor for maintaining the said switch in open condition to inactivate the said contact means during normal motor rotation.

5. In control apparatus for placing a load in a desired position, in combination, a pair of relatively movable members, one of the members having electrical conducting elements and a neutral point, the other member having a contact element engageable with one or the other of the said conducting elements depending upon the desired direction of load movement, drive means including a motor for moving the load, an energizing circuit for said motor, one of the said pair of members being pre-set to displace the said neutral point and contact element according to the desired load position, means under control of the load motor for moving the other member to cause alignment of said contact element and neutral point to stop the motor, the said member overrunning beyond the neutral point into engagement with the other conducting element to cause a reversal of motor rotation, contact means in said energizing circuit for periodically interrupting the current to the said load motor, a switch having two contact blades, a rotary member engageable with the said contact blades and frictionally driven from the load motor, and stop means positioned relatively to the two said contact blades of the switch and the said rotary member to limit the turning of the said member, the said friction driven member abutting one of the stops in one direction of motor rotation to maintain one of the contact blades away from its companion, and abutting the other stop in the opposite direction of motor rotation to maintain the other contact blade away from the first contact blade, the said contact blades engaging each other during the movement of the said rotary member between the said stops to render the said contact means effective to reduce speed of motor rotation.

6. In an electrical control circuit, in combination, a reversible motor, a load coupled to said motor, a first control element comprising conductive means provided with a neutral point, a second control element coupled to said motor for displacement relative to said first element, switch means adapted to energize said motor for rotation in one or the other direction upon engagement of a respective portion of said first by said second control element, said portions being located on opposite sides of said neutral point, and to de-activate said motor upon registration of said second control element with said neutral point, a first member coupled with said motor for displacement thereby, a second member having surface engagement with said first member so as to be displaceable by the latter between two limiting positions of said second member, stop means for arresting said second member in either of said two limiting positions while permitting continued displacement of said first member, contact means operable by said second member in a position thereof intermediate said two limiting positions, and circuit means controlled by said contact means to reduce the speed of said motor while said second member is in said intermediate position.

7. In an electrical control circuit, in combination, a reversible motor, a load coupled to said motor, a first control element comprising conductive means provided with a neutral point, a second control element coupled to said motor for displacement relative to said first element, switch means adapted to energize said motor for rotation in one or the other direction upon engagement of a respective portion of said first by said second control element, said portions being located on opposite sides of said neutral point, and to de-activate said motor upon registration of said second control element with said neutral point, a first member coupled with said motor for rotation thereby, a second member frictionally engageable by said first member so as to be rotatable by the latter between two limiting positions of said second member, stop means for arresting said second member in either of said two limiting positions, contact means operable by said second member in a position thereof intermediate said two limiting positions, and circuit means controlled by said contact means to reduce the speed of said motor while said second member is in said intermediate position.

8. The combination according to claim 7 wherein said motor has an armature and two field windings in series with said armature, said windings being each energizable over said second control element and a respective one of said portions, said circuit means being arranged to connect one of said windings in parallel with said armature and in series with the other of said windings so as to increase the motor field when said second member is in said intermediate position.

9. The combination according to claim 8, further comprising electrical interrupter means having a normally closed contact in series with said armature, said contact means being arranged to actuate said interrupter means so as to vibrate said normally closed contact when said second member is in said intermediate position, whereby said armature will be periodically de-energized.

MICHEL N. YARDENY.

REFERENCES CITED

The following references are of record in the file of this patent:

UNITED STATES PATENTS

| Number | Name | Date |
| --- | --- | --- |
| 387,714 | Fiske | Aug. 14, 1888 |
| 599,015 | Rowntree | Feb. 15, 1898 |
| 803,209 | Bates | Oct. 31, 1905 |
| 932,031 | Krone et al. | Aug. 24, 1909 |
| 1,066,678 | Sundh | July 8, 1913 |
| 1,651,852 | Trenor | Dec. 6, 1927 |
| 1,749,842 | Pfretzschner | Mar. 11, 1930 |
| 2,331,354 | Stout | Oct. 12, 1943 |
| 2,342,717 | Yardeny | Feb. 29, 1944 |

FOREIGN PATENTS

| Number | Country | Date |
| --- | --- | --- |
| 315,287 | Germany | Nov. 3, 1919 |